United States Patent [19]

Ismail et al.

[11] 3,927,151

[45] Dec. 16, 1975

[54] PROCESS FOR THE PREPARATION OF PHOSPHORUS-CONTAINING COMPOUNDS

[75] Inventors: Roshdy Ismail, Neunkirchen; Arnold Lenz, Cologne-Stammheim; Erich Termin, Niederkassel, all of Germany

[73] Assignee: Dynamit Nobel Aktiengesellschaft, Cologne, Germany

[22] Filed: Feb. 1, 1973

[21] Appl. No.: 328,799

Related U.S. Application Data

[63] Continuation of Ser. No. 7,990, Feb. 2, 1970, abandoned.

[30] Foreign Application Priority Data

Feb. 1, 1969 Germany............................ 1905095

[52] U.S. Cl.................................. 260/975; 260/973
[51] Int. Cl.².... C07F 9/08; C07F 9/16; C07F 9/40
[58] Field of Search............................ 260/973, 975

[56] References Cited
UNITED STATES PATENTS 3,209,021    9/1965    Mitchell et al...................... 260/975

*Primary Examiner*—Richard L. Raymond
*Attorney, Agent, or Firm*—Burgess, Dinklage & Sprung

[57] ABSTRACT

Phosphorus-containing compounds, especially alkyl phosphates, of the formula

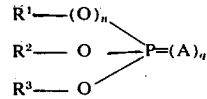

wherein A is oxygen or sulfur, $g$ and $n$ are 0 or 1, and $R^1$, $R^2$ and $R^3$, which may be the same or different, are alkyl, cycloalkyl or aryl wherein $R^1$ may be substituted with one or more halogen atoms; are formed from the corresponding halo- or halo-alkoxy-phosphorus compounds and a hydroxy-containing organic compound by reaction therebetween under gradual increase of temperature and simultaneous decrease in pressure, over an organo oxy compound catalyst comprising an element of Group II, IV or V of the Periodic System having an atomic number of between 12 and 83, in amounts of from 0.001 to 2 per cent by weight, based on the amount of starting phosphorus compound reactant.

20 Claims, No Drawings

PROCESS FOR THE PREPARATION OF PHOSPHORUS-CONTAINING COMPOUNDS

This is a continuation of application Ser. No. 7,990 filed Feb. 2, 1970, now abandoned.

This invention relates to the manufacture of phosphorus-containing compounds and particularly to a catalytic synthesis of such compounds.

A number of processes for the preparation of alkyl phosphates are known but each one is subject to certain disadvantages. For instance, it is possible to directly convert phosphoroxychloride with alcohols without the use of any catalyst with splitting off of HCl. This published synthesis has the drawbacks of requiring long reaction times, use of large excesses of alcohol and the very low yields obtained. Even when using alcohol in greater than stoichiometric amounts the conversion, i.e., the dehydrochlorination, amounts to only up to 60 to 70 mole per cent based on phosphoroxychloride. There is formed essentially only the diester, e.g., dialkyl phosphoric acid chloride. The chlorine atom still present in the molecule is extraordinarily inert. If extreme reaction conditions are used there rather occurs a splitting-off of H$_2$O to result in, as a practical matter, a substantial amount of undesired by-products. This sort of difficulty in alkyl phosphate synthesis is described for instance in the text of Kosolapoff, "Organophosphorus Compounds" (1950) pp. 211, 212.

In another conventional process, trialkyl phosphates are formed by the reaction of phosphoric acid dialkyl chloride and aluminum alcoholate (see, e.g., U.S. Pat. No. 1,799,349). In this process the removal of the alkyl containing by-products is difficult and expensive. In addition, the yield is, in this process, also very low.

It has further been proposed to prepare trialkyl phosphates by the reaction of phosphoroxychloride with metal alcoholates. The yields are better in such a reaction but the removal of the metal chlorides formed presents considerable difficulty. If one starts with the phosphoroxychloride and the alcohols directly, it is known that the yield of trialkyl phosphate can be increased by removal of the HCl evolved, e.g., by addition of tertiary amines in greater than stoichiometric amounts. This technique is, however, also cumbersome and expensive.

It is further known that in these reactions metals such as copper powder, iron shavings, or calcium or magnesium can be used as catalysts. Also, halogenides such as aluminum trichloride, ferric chloride, magnesium chloride, titanium tetrachloride, titanium trichloride, zirconium chloride and boron trifluoride and sulfates and metal oxides, such as, for instance, copper sulfate, manganese oxide or cupric oxide have been used as catalysts in such reaction. The processes in which such catalysts are used also have disadvantages. For one thing the metals, or the metal compounds, must be used in such high concentrations that their use and also their removal from the reaction mixture, is very expensive. In addition, the reaction time required is unsatisfactorily long and substantial amounts of by-products are formed. In this connection there are further difficulties due to the formation of insoluble complex compounds in the use of aluminumtrichloride as a catalyst and in the distillation of the trialkyl phosphates obtained.

It has now been found that phosphorus compounds can be produced in a simple, efficient and commercially economical fashion by means of a synthesis not subject to the disadvantages of the prior art processes.

Essentially, the process of this invention comprises the manufacture of phosphorus containing compounds of the general formula

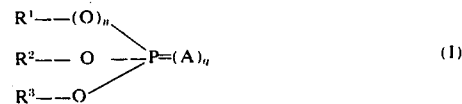   (I)

in which A is oxygen or sulfur; $q$ and $n$ are 0 or 1; R$^1$, R$^2$ and R$^3$, which may be the same or different, are alkyl, cycloalkyl or aryl wherein R$^1$ may be substituted with one or more halogen atoms. These compounds are prepared by reaction of a phosphorus compound of the general formula

   (II)

in which A and $q$ have the same meanings as above, Z and Y can be chlorine or bromine or Z and Y can be R$^1$ or R$^2$ as defined above or R$^1$O— or R$^2$O—, respectively where R$^1$ and R$^2$ are as defined above; and X can be chlorine or bromine; with a hydroxyl group containing organic compound of the general formula

   (III)

wherein D is R$^1$, R$^2$ or R$^3$ as defined above. The process is carried out in the presence of catalysts and optionally in the presence of organic solvents and takes place with splitting off of hydrogen chloride or hydrogen bromide.

A salient feature of this invention is that the reaction temperature which is kept between 0°C. and the boiling point of the reactants at the beginning of the reaction is increased during the course of the reaction, preferably after final mixing of all reactant components to the boiling point of the product formed. The reaction pressure which is preferably atmospheric at the beginning of the reaction is simultaneously decreased to 200 to 10 millimeters Hg, preferably to 90 to 40 millimeters Hg. The reaction is carried out in the presence of a catalyst which is an organo oxy-compound of the elements of Groups II, IV or V of the Periodic System having atomic numbers between 12 and 83, preferably of the elements Mg, Ca, Ti, Ge, Zr, V, As or Sb; and a mono- or polyvalent arylalkyl alcohol, aliphatic or cycloaliphatic alcohol, or phenol, as the organic component of said organo oxy-compound. The catalyst is used in a concentration of 0.001 to 2.0 per cent by weight, based on the amount of phosphorus compound reactant used.

The phosphorus compound reactants in the process of this invention may be phosphorus chloride, thiophosphorus chlorides, phosphono chlorides, thiophosphono chlorides, phosphine chlorides and thiophosphine chlorides or the corresponding bromides. As specific examples, the following may be mentioned: phosphoric acid halogenides, such as, e.g., phosphoric-(V)-oxychloride, phosphoric-(V)-oxybromide, phosphoroxybromidechloride, phosphorus trichloride or bromide, alkyl and aryl substituted phosphoric acid chloride whose hydrogen atoms in the alkyl or aryl moieties may be replaced by halogen hydroxyl or alkoxy, such as phosphoric acid ethylester dichloride, phosphoric acid propylester dibromide, phosphoric acid-2-ethylhexylester dichloride, phosphoric acid dipropylester bromide, phosphoric acid didecylester chloride, phosphor acid decyclohexylester chloride, phosphoric acid phenylester dichloride, phosphoric acid diphenylester bromide, phosphoric acid-2-chloroethyl dichloride, phosphoric acid-p-chlorophenylester dichloride, phosphoric acid-2-bromoethylester dibromide, phosphoric acid di-(2-chloropropylester)-chloride, phosphoric acid di-(p-chlorophenylester)-chloride, phosphoric acid-(p-chlorophenyl)-dibromide, phosphoric acid-(1,3-butanediolester)-chloride, phosphoric acid-(1,3-hexanediolester)-dichloride, 1,4-butanediol-bis-(phosphoric acid dichloride), phosphoric acid methoxyethyl dichloride, phosphoric acid ethoxypropyl dichloride and phosphoric acid phenoxyethylester dichloride.

The hydroxy-containing organic compound reactant of Formula (III) above, can be an aliphatic alcohol, i.e. D can be a straight-chain or branched-chain or a cyclic moiety. Specifically exemplary are the following: ethanol, isopropanol, n-butanol, n-pentanol, isopentanol, n-hexanol, isohexanol, 2-ethylbutanol-1, 2,2,4-trimethylpentanol, n-heptanol, n-octanol, 2-ethylhexanol, isooctanol, n-nonanol, isononanol, ndecanol, isodecanol, n-dodecanol, 2-butyloctanol-1, tridecanol, tetradecanol, pentadecanol, octadecanol, phenylethanol, cyclohexylmethanol, cyclohexylethanol, cyclohexylbutanol, cyclododecanol and cyclooctanol.

Primary as well as secondary alcohols can be used in the reaction. Preferred because particularly good yields were obtained are primary chain alcohols with a substituent or substituents in the 2-position, as the reactant D—OH of Formula(III) above.

The process of this invention is particularly suited for, and especially advantageous in, the preparation of phosphorus containing compounds in which an aliphatic alcohol is a starting material. In conventional processes, phenols performed rather well as reactants while on the other hand aliphatic alcohols were relatively very unreactive, in prior art syntheses. For this reason it was especially surprising that the present process yields excellent results when aliphatic alcohols are used as reactants and this feature of the process represents a substantial technical advance. However, the basic process of this invention is applicable to phenol reactants as well. For instance, the following illustrative phenols can be employed: o-cresol, p-cresol, m-propylphenol, 4-tert.-butylphenol, nonylphenol, dodecylphenol, 2,6-dimethylphenol and 3,4,5-trimethylphenol.

The process of the invention may be carried out in the presence of inert organic solvents such as aliphatic and aromatic hydrocarbons as well as simple and cyclic ethers. The aliphatic hydrocarbons may be single compounds or mixtures thereof such as isooctane and benzene fractions such as, for instance, those with a boiling point range of 120° to 180°C. Benzene, nitrobenzene, toluene and xylene are illustrative of suitable aromatic hydrocarbons. Ethers suitable as solvents of the reaction are, for instance, diisopropyl ether, diisoamylether, diphenylether, 1,4-dioxane and the like; accordingly, aliphatic and aromatic open-chain ethers may be used.

As illustrative of the catalysts which may be used in the invention, i.e., the organo oxy compounds of elements of Group II, IV and V of the Periodic System wherein such elements have atomic numbers between 12 and 83, there can be mentioned the alcoholates and phenolates of such metals and the silicic acid esters.

For instance, the following compounds can be specifically mentioned: dimethoxymagnesium, diethoxymagnesium, magnesiummethylglycolate, calciummethylglycolate, tetraethylsilicate, tetrabutylsilicate, aminopropyltriethoxysilane, germaniumtetraphenolate, germanium-2-ethylhexanolate, titaniummethylate, titanium-ethylate, or -isopropylate, -butylate, -2-ethylhexanolate, -cresylate, -phenylate, -zirconium-propylate, -oleate, octolate, arsenic butylate and antimony butylate. Some of these organo oxy compounds have the formula $Me(OR)_x$ where Me is a metal of Group II, IV or V of the Periodic System, zirconium or hafnium, R is alkyl, aminoalkyl or aryl and $x$ is the valance of Me. In such formula where $x$ is greater than 1, the respective R groups can be the same or different. The alkyl or aminoalkyl group can contain up to 18 carbon atoms. R can also be a cycloaliphatic group.

Within the compass of the catalysts that may be used in this invention are metal compounds in which there may be a covalent bond in addition to the salt-like or ester-like bond between the metal atom and the organic residue. Especially to be mentioned here are complex compounds such as those derived from acetylacetone, i.e., for example titanium acetylacetonate, zirconium acetylacetonate, vanadium oxydiacetylacetonate, vanadium triacetylacetonate, arsenic acetylacetonate and manganese acetylacetonate.

Particularly preferred, because of their outstanding catalytic effectiveness, are organo oxy compounds which are based on the following metals: Mg, Ca, Ti, Ge, Zr, V, As and Sb.

Preferably, the organo oxy compounds used as catalysts are derived from alcohols or phenols which contain $R^1$, $R^2$ or $R^3$ as the alkyl or aryl moiety. If more than one hydroxy group-containing compound of the formula D—OH (III) is reacted in the process, then the lowest boiling of such hydroxy compounds should be preferably the base substance from which the catalyst used is derived. Also preferred are catalysts which are derived from alcohols or phenols which have a lower boiling point than all of the hydroxy group-containing compounds used in the reaction. This selection of catalyst in relation to their alcohol or phenol base is important because appropriate selection of the catalyst obviates the formation of undesired alcohol or phenol moieties that might be formed by transesterification reactions. It is known that the alcohols with the lowest boiling points escape from the transesterification reaction, i.e. reaction mixture.

In the process of this invention it was unexpected that in the case of using phosphorus-(V)-oxychloride or -bromide all three halogen atoms reacted during the reaction, i.e., all three halogen atoms are split off in the form of HCl or HBr. After removal of the first two halogen atoms, which notoriously are more reactive, the third, relatively, inert, halogen atom also reacts in surprising fashion. In addition, it was unexpected that the catalysts used in the invention are effective at very low concentrations.

A further advantage of the instantly used catalysts is that, in contradistinction to known catalysts, the instant materials are neutral, that is they are not acid substances. Side reactions are substantially obviated because of this characteristic.

In some cases, it is possible to enhance the effectiveness of the catalysts used in this invention by adding an amine or a carboxylic acid amine such as, for instance, n-butylamine, ethylenediamine, N-methylpyrrolidone, tributylamine, triallylamine, N,N-dibutylaminoacetonitrile, N,N-dimethylcyclohexylamine, N,N-dimethylaniline, formamide, N-dimethylformamide, acetoacetanelide, dibutylbenzoic acid amide, or dibutylacetamide. The amount of these additionally used activators should be between 30 and 600 mole per cent based on the amount of organo oxy compound used as the basic catalyst. An additional positive effect of using an activator is that the remaining content of chlorine or bromine in the final product is reduced.

According to the invention the reactants are advantageously reacted in such a ratio that for each mole of chlorine or bromine in the phosphorus compound reactant there are employed from 1 to 1.5 moles of the hydroxy group containing organic compound. When using more than one hydroxy group-containing compound, a mixture of such compounds can be used, but preferably they are used in stages, i.e. sequentially, in the reaction with the phosphorus compound reactant. This latter procedure leads to essentially pure end products which contain correspondingly more (and different) moieties $R^1$, $R^2$ or $R^3$.

A specific procedure by which the process of this invention is conveniently carried out is as follows. A hydroxy group-containing organic compound is introduced into a reactor and then the catalyst is added. The phosphorus compound reactant is added slowly and continuously, or in small portions with stirring, at a temperature between 0°C. and the boiling points of the reactants and at atmospheric pressure. The optimum temperature and the rate of addition may differ according to the reactivity of a particular mixture; this can be usually determined by experimentation. Most often a time period of up to one-half hour should be sufficient for the addition. Once both reactants have been mixed, nitrogen is led through the reaction mixture to provide sparging or exhausting of the HCl formed. After mixing of the reactants the pressure in the reactor is preferably lowered to 200 – 10 mm Hg., optionally to 90 – 40 mm Hg. In any case, in the process of this invention the reaction mixture is slowly heated up to, at the highest, the boiling point of the product being formed and preferably to 5° to 95°C. This raising of the temperature may not be carried out too rapidly because otherwise the danger exists that the more volatile reactants such as, for instance, POCl₃ may at least partially evaporate off. According to the particular reactants and catalysts the reaction mixture must be held at this temperature for one to five hours in order to substantially complete the reaction. Using this technique, raw products having chlorine contents from between 0.03 to 1.5 weight per cent are obtained. The chlorine content is an indication of the amount of unreacted phosphorus compound used as a reactant. Thus, this residual chlorine content means that from about 92 to about 99.1 mole per cent HCl have been split off during the course of the reaction.

If more than one hydroxy group-containing organic compound is used in stages, then it is advantageous to proceed in reverse fashion. In this case, the (halo) phosphorus compound reactant is first introduced into the reactor with the catalyst and then the addition of hydroxy group-containing compounds is effected in two or three stages, after each of which reaction takes place. In some cases it is appropriate to isolate the respective intermediate products and to purify same, if necessary, before their reaction in the next stage; by use of such a technique especially pure end products are obtained.

Sometimes it is desirable to neutralize the thus-obtained reaction mixture by washing with an aqueous alkaline solution such as a 10 per cent by weight sodium carbonate solution at a temperature of from 20° to 150°C. A subsequent washing with sodium chloride solution and/or with pure water is often advantageous. By means of such subsequent steps the residual chlorine content in the final products can at times be reduced even further. This residual chlorine content can also be reduced by the addition of alkali metal or alkaline metal alcoholates. Preferably there are used alcoholates of the alcohols used as a reactant. In any event, excess alcohol must be removed by washing with water.

A still further method to remove the residual halogen content is to cook the resulting reaction mixture for about 30 minutes with a small amount of zinc dust and then to filter off the remaining solid product. Finally, it is to be emphasized that the residual halogen can be removed, in principle, via ion exchangers. Water remnants and excess oxy compound can be removed most simply through distillation. Also, the end product can be distilled, but in most cases the process of this invention does not require this additional step. At times a precipitate is formed in the course of carrying out the process of the invention. In such cases a filtration is required.

The phosphorus containing compounds produced by this invention find many use applications. For instance, they are useful as softeners and as flame protective agents in high polymers. According to structure and size of molecule, they can also be used as hydraulic fluid and/or as cooling and heating fluid. In addition, particularly those products in which A, as defined above, is sulfur, e.g., compounds derived from phosphorus sulfochloride, are active as insecticides.

EXAMPLE 1

Preparation of Tri-(2-Ethylhexanol)-Phosphate

500 Grams of 2-ethylhexanol and 2 ml. of tetrabutyltitanium (as a catalyst) were introduced into a 1-liter 4-neck flask equipped with cooling means, thermometer, stirrer and dropping funnel. 184 Grams of POCl₃ were added over a period of 30 minutes from the funnel at a temperature of between 30° and 40°C. The pressure in the reaction vessel was then lowered to about 50 mm Hg. over a period of three hours and the temperature of the mixture was simultaneously increased to 100°C. Subsequently, the temperature was further increased to 120°C. and the pressure was decreased further to 40 mm Hg. Two hours later, the reaction was substantially completed, tthat is 95% of the theoretically possible amount of the HCl was split off. The degree of splitting-off of HCl during the course of the reaction while the temperature was increased and the pressure was decreased is apparent from Table I, below.

TABLE I

| Temperature in the Reactor °C | Pressure in the Reactor mm Hg | Amount of HCl Split Off Mole % |
|---|---|---|
| 50 | 90 | 50 |
| 60 | 80 | 60 |
| 80 | 80 | 70 |
| 100 | 50 | 80 |
| 120 | 40 | 95 |

Subsequently the mixture was neutralized by washing it with 150 ml. of 10 weight per cent aqueous sodium carbonate solution and then again by washing with 150 ml. of a 10 weight per cent sodium chloride solution and the mixture was further purified by washing with water twice. Water remaining in the reaction mixture and excess amounts of the 2-ethylhexanol were distilled off. A white voluminous precipitate in the material remaining after distillation (i.e., the end product) was removed by filtration. The end product was a colorless liquid, having the following characteristics:

Refractive index $n_D^{20}$ : 1.4436
Boiling point at 1 to 2 mm Hg: 202°C.
The yield was 95% of the theoretical.

EXAMPLE 2

Preparation of Phosphoric Acid Tributyl Ester

As in Example 1, 400 grams of butanol were brought to react with 154 grams of phosphoroxychloride by use of 1.5 ml of vanadium propylate as a catalyst. The addition of the phosphoroxychloride took place over a period of 30 minutes at 50°C. Subsequently, the pressure was lowered to 50 mm Hg and the reaction mixture was maintained at 50°C. for 2 hours. After purification as in Example 1, a colorless ester was produced.

The yield was 95% of theory.
The boiling point at 5 to 6 mm Hg was 137°C.

EXAMPLE 3

Preparation of Phosphoric Acid Tri-2-methylpropyl Ester

As in Example 1, 400 grams of 2-methylpropanol were brought to react with 154 grams of phosphoroxychloride by use of 1.5 ml of zirconium tetrabutyl as a catalyst. After purification a colorless liquid was formed which had a boiling point of about 114°C. at 5 to 6 mm Hg.

The yield was 92% of theory.

EXAMPLE 4

Preparation of Phosphoric Acid Tripentyl Ester

As in Example 1, 480 grams of pentanol-1 were brought to react with 154 grams of phosphoroxychloride by use of 1.0 grams of zirconium tetrapropyl as a catalyst. After formation of this mixture it was stirred for 2 hours at 50°C. at 25 to 40 mm Hg. After a purification procedure as in Example 1 a product formed which had a boiling point of 196°C. at 3 mm Hg.

The yield was 90% of theory.

EXAMPLES 5 to 16

The procedure was as in Example 1 except that in place of titaniumtetrabutyl, the catalysts set forth in Table II were used. It is evidenced by the data in Table II that the type of catalyst used is decisive with regard to the completeness of the reaction. The smaller the residual chlorine content in the raw product the more complete and therefore more advantageous was the course of the reaction. Particularly preferred is the use of vanadium isopropylate or N-butylate because of its exceptional effectiveness as a catalyst. It may further be noted that an addition of formamide to the catalyst resulted in a lowering of the residual chlorine content. Without addition of catalyst the reaction is incomplete and there remained a residual chlorine content of 3.9%. The complete results are set forth in Table II.

TABLE II

| Ex. No. | Catalyst | Amount of Catalyst (Grams) | Residual Chlorine Content (Weight %) |
|---|---|---|---|
| 5 | Magnesium methylate | 0.5 | 0.9 |
| 6 | Gamma-Aminopropyl-triethoxysilane | 0.5 | 1.5 |
| 7 | Tetrabutyl titanate | 0.5 | 0.4 |
| 8 | Tetrabutyl titanate and 0.5 ml Formamide | 0.5 | 0.35 |
| 9 | Titanium tetra-(acetyl acetonate) | | 1.1 |
| 10 | Zirconium tetrapropylate | 0.5 | 0.6 |
| 11 | Zirconium acetyl acetonate | 0.5 | 1.4 |
| 12 | Vanadyl isopropylate | 0.5 | 0.22 |
| 13 | Vanadyl n-butylate | 0.5 | 0.28 |
| 14 | Vanadium-IV-acetyl acetonate | 0.5 | 1.3 |
| 15 | Vanadium-III-acetyl acetonate | 0.5 | 0.6 |
| 16 | no catalyst | — | 3.9 |

What is claimed is:

1. Process for the preparation of phosphorus-containing compounds of the general formula

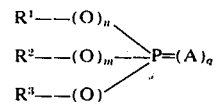

in which A is oxygen or sulfur; $q$, $m$ and $n$ are 0 or 1; $R^1$, $R^2$ and $R^3$, which may be the same or different, are straight-chained or branched chain alkyl, cycloalkyl or aryl wherein $R^1$ may be substituted with one or more halogen atoms, which process comprises reacting a phosphorus compound of the general formula

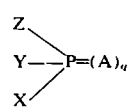

in which A and $q$ have the same meanings as above, Z and Y can be chlorine or bromine or Z and Y can be $R^1$, or $R^2$ as defined above or $R^1O-$ or $R^2O-$, respectively, where $R^1$ and $R^2$ are defined as above and X can be chlorine or bromine, with a compound of the general formula

D — OH in which D is $R^1$, $R^2$ or $R^3$ as defined above, wherein the temperature at the commencement of the reaction is between 0°C and the boiling points of the reactants and where the temperature is increased during the reaction up to the boiling point of the reaction product formed and wherein the reaction pressure is simultaneously lowered to 200–10 mm.Hg. in the presence of an organo oxy compoud catalyst which catalyst is either
   a. a compound having the formula Me(OR)$_x$ wherein Me is a metal of Groups II or V of the Periodic Table having an atomic number between 12 and 83 or zirconium, silicon, germanium or hafnium, R is alkyl or aminoalkyl having up to 18 carbon atoms, a cycloaliphatic group or aryl having up to 7 carbon atoms, $x$ is the valence of Me, or b. a compound selected from the group consisting of titanium acetylacetonate, vanadium-III acetylacetonate, zirconium acetylacetonate, vanadium oxy diacetyl acetonate, vanadium triacetyl acetonate, vanadium-IV-acetylacetonate, arsenic acetylacetonate, vanadylisopropylate, vanadyl n-butylate, vanadyl propylate, magnesium methyl glycolate, calcium methyl glycolate, zirconium oleate and manganese acetylacetonate the catalyst concentration being from 0.001 to 2percent by weight based on the weight of the phosphorus reactant used.

2. Process as claimed in claim 1 wherein the starting reaction pressure is atmospheric pressure.

3. Process as claimed in claim 1 wherein the reaction temperature is increased and the reaction pressure is decreased only after all reactants have been completely mixed.

4. Process as claimed in claim 1 wherein the reaction pressure is lowered to about 90 to 40 mm Hg. during the course of the reaction.

5. Process as claimed in claim 1 in which the organo oxy compound catalyst contains, as the metal element, Mg, Ca, Ge, Zr, V, As or Sb.

6. Process as claimed in claim 1, wherein the reactants are used in such a reactant ratio that 1 to 1.5 moles D — OH compounds are used for each mole of chlorine or bromine in the reactant.

7. Process as claimed in claim 1 in which two or three different D — OH compounds are reacted with the phosphorus-containing compound in two or three successive stages, respectively.

8. Process as claimed in claim 1 in which an organic amino or carboxylic acid amide is used in addition to the catalyst, in an amount of from 30 to 600 mole percent, based on the amount of organo oxy compound used as the catalyst, said organic amine or carboxylic acid amide selected from the group consisting of n-butyl amine, ethylene diamine, N-methylpyrrolidone, tributylamine, triallylamine, N,N-dibutylaminoacetonitrile, N,N-dimethylcyclohexylamine, N,N-dimethylaniline, formamide, N-dimethylformamide, acetoacetanilide, dibutylbenzoic acid amide and dibutylacetamide.

9. Process as claimed in claim 1 in which the phosphorus compound reactant is phosphorus-(V)-oxychloride.

10. Process as claimed in claim 1 in which the D — OH compound reactant is a straight-chain or branched-chain alkanol.

11. Process as claimed in claim 1 in which the reaction product mixture is washed with an alkaline liquid at a temperature of 20° to 150°C. and then with water.

12. Process as claimed in claim 11 in which the alkaline liquid is an aqueous sodium carbonate solution.

13. Process as claimed in claim 1, wherein $R^1$, $R^2$ and $R^3$ are alkyl groups.

14. Process as claimed in claim 1, wherein $R^1$, $R^2$ and $R^3$ are aryl groups.

15. Process according to claim 1, wherein said catalyst is a zirconium-containing catalyst selected from the group consisting of zirconium tetrapropylate, zirconium acetyl acetonate, tetrabutyl zirconate and tetrapropyl zirconate.

16. A process according to claim 1, wherein the catalyst is selected from the group consisting of vanadyl isopropylate, vanadyl-n-butylate, vanadium-IV-acetyl acetonate, vanadium-III-acetyl acetonate and vanadyl propylate.

17. A process according to claim 1, wherein the catalyst is selected from the group consisting of dimethoxymagnesium, diethoxymagnesium, magnesium methylglycolate, calcium methylglycolate, tetraethylsilicate, tetrabutylsilicate, aminopropyltriethoxysilane, germaniumtetraphenolate, germanium-2-ethylhexanolate, zirconium propylate, zirconiumoleate, zirconiumoctolate, arsenic butylate and antimony butylate, zirconium acetylacetonate, vanadium oxydiacetylacetonate, vanadium triacetylacetonate, arsenic acetylacetonate, manganese acetylacetonate, zirconium tetrapropylate, zirconium tetrabutyl, zirconium tetrapropyl, vanadylisopropylate, vanadyl-n-butylate, vanadium-IV-acetyl acetonate, vanadium-III-acetylacetonate and vanadyl propylate.

18. A process according to claim 1 wherein the catalyst is tetrabutyl zirconate or tetrapropyl zirconate.

19. A process according to claim 1 wherein said catalyst is vanadyl isopropylate.

20. A process according to claim 1 wherein said catalyst is vanadyl-n-butylate.

* * * * *